(No Model.)

J. H. HESS.
HOSE COUPLING.

No. 576,119. Patented Feb. 2, 1897.

Witnesses.
O. N. Keeney.
Anna V. Faust.

Inventor.
John H. Hess
By Benedict & Morsell
Attorneys.

UNITED STATES PATENT OFFICE.

JOHN H. HESS, OF MILWAUKEE, WISCONSIN, ASSIGNOR OF ONE-HALF TO THEODOR BOLL, OF SAME PLACE.

HOSE-COUPLING.

SPECIFICATION forming part of Letters Patent No. 576,119, dated February 2, 1897.

Application filed August 29, 1896. Serial No. 604,266. (No model.)

*To all whom it may concern:*

Be it known that I, JOHN H. HESS, of Milwaukee, in the county of Milwaukee and State of Wisconsin, have invented a new and useful Improvement in Hose-Couplings, of which the following is a description, reference being had to the accompanying drawings, which are a part of this specification.

My invention has relation to improvements in hose-couplings.

It is my object to provide an improved construction in which the coupling and uncoupling are effected with the least possible trouble, and when coupled a most secure connection is afforded, and the danger of the hose being damaged or broken at the point of connection reduced to the minimum.

With the above primary object in view the invention consists of the devices and parts, or their equivalents, as hereinafter more fully set forth.

Figure 1:
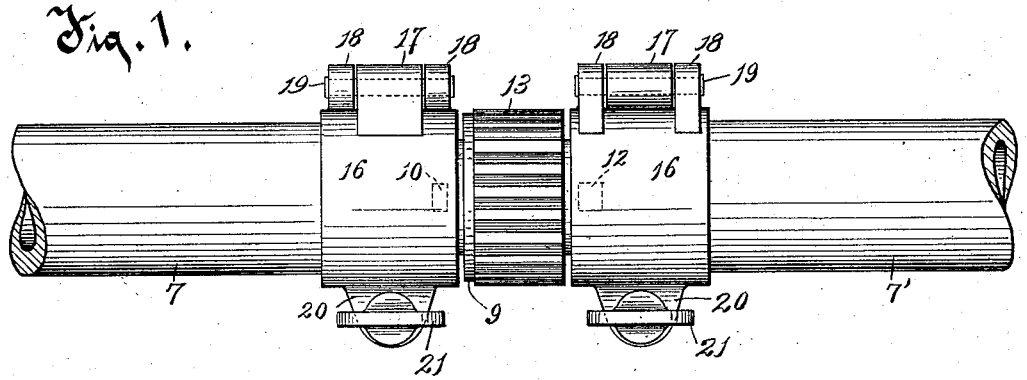
Figure 2:
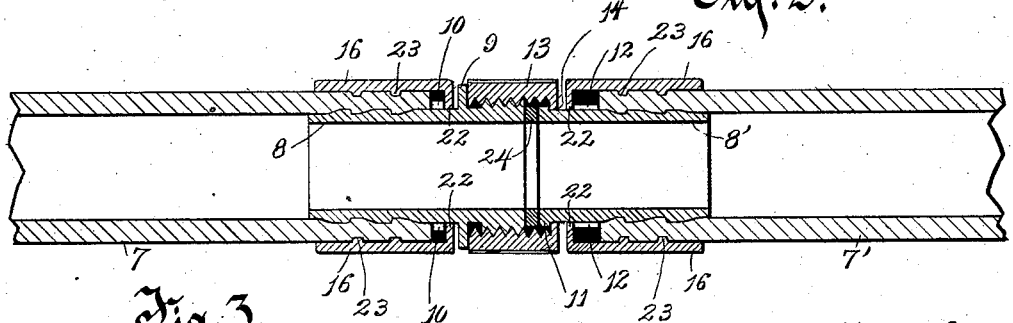
Figure 3:
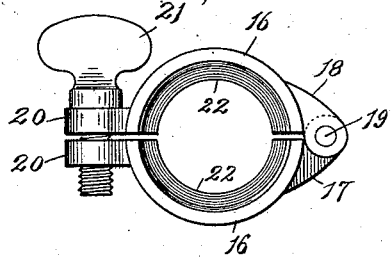
Figure 5:
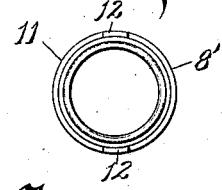
Figure 6:
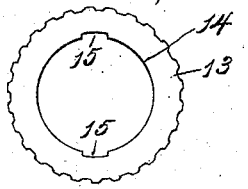
Figure 4:
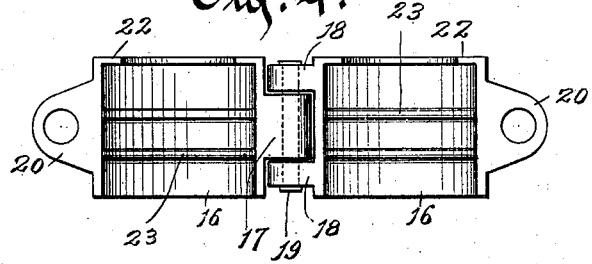

In the accompanying drawings, Figure 1 is a view of two sections of a hose, showing my improved coupling in connection therewith. Fig. 2 is a longitudinal sectional view of Fig. 1. Fig. 3 is an end view of one of the couplings. Fig. 4 is a view of one of the couplings opened out to show the interior of the two sections thereof. Fig. 5 is an end view of one of the inner tubes, and Fig. 6 is an end view of the nut.

Referring to the drawings, the numerals 7 7' indicate the two sections of a flexible hose, and 8 8' inner metallic tubes which are inserted into the ends of the hose-sections. These tubes are advisably provided peripherally with a series of ridges, whereby a firm hold on the hose is secured. The tube 8 is provided near its outer end with an annular shoulder 9, and from this shoulder outwardly is formed with screw-threads. Back of the annular shoulder 9 the tube is provided at opposite points with lugs 10 10. The other tube, 8', is also provided upon its exterior surface with a series of ridges for the purpose of securing a firm hold on the hose, and at its end is formed with an annular flange 11. This tube 8' is also provided at opposite points with projecting lugs 12 12.

The numeral 13 indicates a nut, the threads thereof adapted to engage the threads at the outer end of the tube 8. The bore of this nut is provided at the end thereof which is adjacent to the tube 8' with an annular shoulder, forming a seat 14 for the annular flange 11. It will be understood that before the tube 8' is forced into the hose-section 7' it is first passed through the nut 13, the flange 11 of the tube 8' seating itself against the seat 14 of the nut and preventing longitudinal separation of the two parts. In order, however, to permit the lugs 12 12 of tube 8' to pass by the seat 14, said seat is provided at opposite points with slots 15 15, with which the lugs are brought into register, whereby a free passage for the lugs is provided.

In the application of the invention, as shown in the accompanying drawings, two of my improved hinged clamps are employed. Each clamp consists of two semicircular sections 16 16, hinged together, the hinged joint being formed by a lug 17, extending from one section and passing between two lugs 18 18, extending from the other section, said several lugs provided with registering openings, through which a hinge-pin 19 is passed. The unhinged edges of the sections are provided with outstanding apertured lugs 20, one or both of said apertures being threaded. These threads are engaged by the threads of a thumb-screw 21, which is passed through the registering apertures. The inner ends of the half-sections of the coupling are provided with inwardly-extending semicircular shoulders 22 22, which, when the clamps are adjusted to the hose-sections, are adapted to engage over the lugs 10 10 and 12 12, whereby the clamps are effectually prevented from being longitudinally separated from the tubes 8 8'.

It is obvious that instead of providing two separate lugs 10 on the tube 8 one continuous projection might be employed. In the case of the tube 8', however, separate lugs, such as 12, are necessary in order to permit the tube to be passed through the nut 13, so that the annular flange 11 of said tube may seat itself against the seat 14. It will also be noted that the interior surfaces of the sections of the clamps are provided with annular ridges 23, which take a firm hold on the exterior surfaces of the hose-sections.

For the purpose of forming a water-tight joint I interpose an annular packing 24, which is adjusted to place by being passed into the nut against the flange 11, the end of the tube 8 being subsequently brought firmly thereagainst.

In the application of my invention, after the tubes 8 and 8' and nut 13 are properly adjusted together and the tubes inserted into the hose-sections, the hinge-clamps are then applied in order to effect a firm and secure coupling. These clamps are made to embrace the hose-sections 7 and 7', the shoulders 22 engaging over the respective lugs 10 and 12 of the tubes 8 and 8'. The thumb-screws are then passed through the apertures of the outstanding lugs 20, and when turned so as to engage the threads the two sections of clamp are brought firmly around the flexible hose. As the hose-sections are confined between the ridges of the inner tubes and the ridges of the sections of the clamps they are held most securely against being pulled out by longitudinal strain thereon, and, furthermore, as the shoulders 22 are back of the lugs 10 and 12 it is impossible for any longitudinal strain or force to separate the couplings from the inner tubes or cause them to move longitudinally and thereby tear or break the flexible hose. The form of hose-coupling now in common use is open to objection, for the reason that the construction of coupling employed is quite liable to tear, break, or damage the hose, especially by reason of the fact that the clamps used in such devices pinch or squeeze the hose to such an extent as to cause a cutting and severance of the ends after some little use. This danger is avoided to a great extent in my construction, as the particular form of hinge-clamp lessens the danger of undue pinching of the flexible hose.

The right-angular shoulders 22 at the ends of the hinged sections not only form square contacting shoulders against the lugs 10 10 or 12 12, and hence reduce to the minimum the liability of the separation of the parts, but, furthermore, form a proper width of space between the hinged sections and the tube for the admission of the hose-sections.

I have shown my invention in the accompanying drawings as applied to the meeting ends of hose-sections. It will also be understood, however, that it may be employed at the ends of hose for coupling to the hydrant in one instance, or to the nozzle in the other. In order to couple to a hydrant, the end of the hose would be provided with the tube 8' and the nut 13 on the tube, said nut adapted to be turned onto the threads of the hydrant and the hinged clamp then applied. In case it is used at the opposite end of the hose for the connection of the nozzle thereto the inner tube 8 alone is employed, and the nozzle screwed onto the threads of said tube, after which the hinged clamp is applied.

What I claim as my invention is—

In a hose-coupling, the combination, of a hose-section, a tube inserted therein, said tube provided with a lug or lugs, a clamp consisting of two similar half-sections hinged together at their meeting edges, and provided at their outer edges with outstanding projections having registering apertures, said sections adapted to embrace the hose, and provided at their outer ends with right-angular inwardly-extending shoulders adapted to engage back of the lug or lugs of the tube, a thumb-screw passing through the registering apertures of the outstanding projections of the hinged sections, and a nut engaging the tube, and adapted for engagement with another part.

In testimony whereof I affix my signature in presence of two witnesses.

JOHN H. HESS.

Witnesses:
ARTHUR L. MORSELL,
ANNA V. FAUST.